United States Patent [19]
Weinkauf

[11] Patent Number: 5,369,170
[45] Date of Patent: Nov. 29, 1994

[54] COMPOSITE SYSTEMS OF POLYKETONE AND AMINATED, MODIFIED POLYOLEFINS

[75] Inventor: Donald H. Weinkauf, Houston, Tex.

[73] Assignee: Shell Oil Company, Houston, Tex.

[21] Appl. No.: 166,135

[22] Filed: Dec. 13, 1993

[51] Int. Cl.$^5$ ............................ C08F 8/32; C08G 67/02
[52] U.S. Cl. ..................................... 525/64; 525/285; 525/382; 525/539; 528/392
[58] Field of Search ................. 525/64, 382, 285, 539; 528/392

[56] References Cited

U.S. PATENT DOCUMENTS

| | | | |
|---|---|---|---|
| H917 | 5/1991 | Gergen et al. | 525/539 |
| 4,543,440 | 9/1985 | Loomis | 525/539 |
| 4,632,962 | 12/1986 | Gallucci | 525/282 |
| 4,654,401 | 3/1987 | Gallucci | 525/64 |
| 4,843,144 | 6/1989 | Van Broekhoven et al. | 528/392 |

OTHER PUBLICATIONS

BP Chemicals, BP Performance Polymers Inc.-Polybond ® Technology.

*Primary Examiner*—James J. Seidleck
*Assistant Examiner*—Thomas Hamilton, III
*Attorney, Agent, or Firm*—James O. Okorafor

[57] ABSTRACT

It is herein disclosed a composite system consisting essentially of a polyketone polymer and an aminated polyolefin, produced by reacting a polyolefin with excess diamine to form an imide with a free primary amine, and causing the primary amine to react with a polyketone chain to form a pyrrole. These reactions can occur during inter alia a co-extrusion hot coating application or blending process. In all cases, compatibilization is achieved by the formation of polyketone/polyolefin graft copolymers at the interface of the polymers.

8 Claims, No Drawings

COMPOSITE SYSTEMS OF POLYKETONE AND AMINATED, MODIFIED POLYOLEFINS

FIELD OF THE INVENTION

This invention generally relates to composite systems. More particularly, the invention relates to a composite system having a strong interfacial adhesion consisting essentially of a polyketone polymer and a modified polyolefin, and to methods for the production of such composite systems.

BACKGROUND OF THE INVENTION

Composite polymer structures and polymer blends are of great commercial interest because of the potential to combine the valuable attributes of a number of materials into one system. Composite laminates of two or more polymers are widely used in barrier packaging applications where the barrier characteristics of one material are combined with the low cost and mechanical properties of another. In polymer blends, combinations of barrier/cost, chemical resistance/dimensional stability, toughness/strength are achieved in a number of commercial materials.

In both composite polymer structures and polymer blends, the compatibilization of the polymer/polymer interface is of critical importance. Weak interfacial bonding between the phases results in delamination and poor mechanical properties. However, strong interfacial bonds are desired to attain the ultimate characteristics of the composite or blend.

It is well known that most polymer pairs are immiscible and do not have strong enough interactions to generate strong interfacial bonds during coextrusion or melt blending. However, several compatibilization strategies have emerged to resolve the expected poor adhesion between polymer pairs. Compatibility and adhesion can be improved by 1) incorporation of a third mutually compatible "tie-layer" between phases, 2) addition of a suitable block or graft copolymer or mutually miscible polymer which bridges the interface, or 3) promotion of in-situ grafting reactions via appropriate functionalization of one or both of the polymers.

Polyketone polymers are well known in the art. These polymers have excellent mechanical and chemical resistance properties which make them particularly attractive for the production of composite structures. However, because of the difficulty of compatibilizing the polyketone polymer/other polymer interface so that resulting bond is sufficiently strong to withstand end-use conditions, the production of polyketone polymer-based composite structures have been compromised. Therefore, methods and/or other polymeric materials which are capable of overcoming this deficiency are of great commercial interest to the industry.

SUMMARY OF THE INVENTION

It is a general object of this invention to provide modified polymeric materials that are capable of grafting to polyketone polymer.

It is a further object of this invention to provided functionalized polyolefins that are capable of grafting to polyketone polymer.

It is a particular object of this invention to provide aminated polyolefins (i.e., amine functionalized polyolefins) that are capable of grafting to polyketone polymer.

It is also a particular object of this invention to provide a method of grafting an aminated polyolefin to a polyketone polymer such that a strong interfacial bond is produced.

Accordingly, it is now provided a composite structure consisting essentially of a polyketone polymer and an aminated polyolefin, produced by reacting a polyolefin with excess amine to form an imide with a free primary amine, and causing the primary amine to react with a polyketone chain to form a pyrrole. These reactions can occur during inter alia a hot coating application, co-extrusion, or blending process. In all cases, compatibilization is achieved by the formation of polyketone/polyolefin graft copolymers at the interface of the polymers.

DETAILED DESCRIPTION OF THE INVENTION

The materials useful in practicing this invention include a linear alternating polymer of carbon monoxide and at least one ethylenically unsaturated hydrocarbon (sometimes simply referred to as a polyketone polymer), modified polyolefin, a functionalizing agent, and other common polymer additives. For instance, fillers, extenders, lubricants, pigments, plasticizers, and other polymeric materials can be added to the compositions to improve or otherwise alter its properties. In general, the practice of this invention involves suitably contacting sufficient quantities of the useful material to form a composite structure having a strong interfacial adhesion.

The polyketone polymers which are employed as the major component of the oxidatively stabilized polymer composition of the invention are of a linear alternating structure and contain substantially one molecule of carbon monoxide for each molecule of ethylenically unsaturated hydrocarbon. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

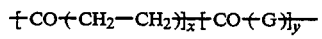

where G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the $-CO-(CH_2-H_2)-$ units and the $-CO-(G)-$ units are found randomly throughout the polymer chain, and preferred ratios of y:x are from about 0.01 to about 0.1. The precise nature of the end groups does not appear to influence the properties of the polymer to any considerable extent so that the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer, and in the case of terpolymers the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144 which is herein incorporated by reference.

Any modified polyolefin is suitable in the practice of the invention. Such modified polyolefins include those modified with acrylic acid or with maleic anhydride. The maleic anhydride grafted polyolefins are preferred. Particularly preferred is maleic anhydride modified polypropylene which are commercially available from BP Chemicals under the trademark of Polybond. Polybond 3001, 3002, and 3005 are reported to have 0.25, 0.5, and 1.0 wt % maleic anhydride incorporated either at the end or as a pendent along the backbone of the polymer chain.

The useful functionalizing agents are typically amines. Examples of such amines include polymethylene diamines, aromatic diamines, diethyltriamine (DETA), triethylenetetramine (TETA), isophorene diamine, and polyether diamines. Diamines with at least two unhindered alkyl primary amines are preferred.

The method of compatibilizing the polyketone and polyolefin polymers comprises a two step process. The first step involves the formation of a primary amine functionalized polyolefin. In the second step, the primary amine is grafted to the backbone of the polyketone. The specific process details for each step is herein further disclosed.

The formation of primary amine functionalized polyolefins is achieved by the melt reaction of an amine with maleated polyolefin. The reaction of maleated polyolefins and compounds containing primary amine groups in the melt state leads to the conversion of maleic anhydride moieties to imides. In the case of the diamines within the scope of this invention, the reaction of primary amine with grafted maleic anhydride moieties leaves a free primary amine which in turn can be employed in other grafting reactions. The melt mixing and reaction of the diamine with the maleated polyolefin can be performed during conventional melt processing of the polyolefin. The reaction will readily proceed at temperatures above the melting point of both the polyolefin and the diamine. The molar ratio of amine groups to maleic anhydride moieties in the melt reaction is above one with the range of 2 to 5 being preferred.

The second step involves the grafting of the amine functionalized polyolefin to the polyketone. The reaction of primary amine with the polyketone backbone can be performed at temperatures above the melting point of the polyolefin (e.g., polyethylene approximately=140° C. and polypropylene approximately=160° C.). It is noted that temperatures above the melting point of the polyketone polymer are not required to produce the grafting reaction. The grafting reaction between the polyolefin and the polyketone can be achieved with the polyketone being a solid substrate or in the melt state. Thus, co-extrusion, blending, and coating applications are suitable. The extent of grafting of the molten polyolefin to the solid substrate generally increases with increasing bonding temperature, bonding pressure, and/or duration of bonding time. When both materials are in the melt states, the extent of grafting reaction will increase with higher melt temperatures, longer residence time in the melt, and/or more intensive mixing.

The inventive method can be used in many applications such as 1) tie-layer systems, 2) polymer/polymer blends, and 3) coatings. Tie-layer systems are used to compatibilize the various components of composite structures such as the layers in coextruded multi-layer films used in packaging applications. Tie-layer systems are also employed in the construction of coextruded tubes and pipes, multi-layer plastic bottles, retortable plastic containers, composite food boxes, and composite cans. Compatibilization mechanisms such as that described in this invention are often employed to achieve the desired balance of properties of barrier/cost, chemical resistance/dimensional stability, and toughness/strength in immiscible polymer/polymer blends. Both tie-layer systems and polymer/polymer blends involve the bonding of two polymers from the melt state where materials are combined during conventional melt processing techniques such as coextrusion and melt blending.

Because the grafting reaction between primary amine and polyketone can be achieved at temperatures below the melting point of the polyketone, it is also possible to use the invention to bond polyolefin coatings to a polyketone substrate. Examples include the application of polyolefin coatings for improved barrier properties, UV protection, and/or decorative purposes.

The invention is further illustrated by the following non-limiting examples.

EXAMPLES

Example 1

The diamine reaction with the modified polypropylene was carried out in a Brabender mixing head. The modified polymer was introduced to the mixing head at 190° C. and mixed for 3 minutes. At that time, the diamine powder was added to the melt and mixed for an additional three minutes. The diamine was added so that 4 moles of amine groups were present for each mole of maleic anhydride. The excess amine was added to limit the amount of crosslinking while providing an ample number of free amine groups to react across the polyketone/polypropylene interface. The amount of 1,12-diaminododecane ranged from 1 to 4 wt% depending on the level of maleic anhydride modification in the polypropylene. Controls were run with a Shell polypropylene homopolymer (PP 5384). After mixing, the compounded material was removed and dried. The diamine-modified polypropylenes exhibited an amber color after the reactive processing step.

Films of the diamine modified and as received maleated polypropylene materials were prepared by compression molding. T-peel test samples were prepared by compression molding and modified polypropylene films between two 20 mil extruded sheets of polyketone polymer. Using a mold temperature of 200° C., the bonding protocol was one minute at 0 tons pressure and one minute at 2 tons pressure. Half of the T-peel specimens were subsequently subject to a steam retort process cycle at 260° F. for 30 minutes in the Barnstead benchtop apparatus. Adhesion was measured on the T-peel specimens using a method based on the D-1876 ASTM method.

TABLE 1

Polypropylene Materials Used

| Sample | Maleic Anhydride Level (wt %) | Melt Flow (ASTM D1238) (g/10 min.) |
|---|---|---|
| Shell PP 5384 | 0.00 | 2 |
| PolyBond 3001 (PB3001) | 0.25 | 3–6 |
| PolyBond 3002 (PB3002) | 0.50 | 5–8 |
| PolyBond 3005 (PB3005) | 1.00 | 40–65 |

TABLE 2

T-Peel Test[1] results showing maximum load observed with the various modified polypropylene both before and after retort.

| Sample | Before Retort Max Load (lbs/in) | After Retort Max Load (lbs/in) |
|---|---|---|
| PP 5384 | No Adhesion | — |
| PP 5384 " 1 wt % 1,12DA[a] | No Adhesion | — |
| PB 3001 | No Adhesion | — |
| PB 3001 + 1 wt % 1,12DA[b] | 9.8 | 9.4 |
| PB 3002 | No Adhesion | — |
| PB 3002 + 2 wt % 1,12DA | 9.1 | 10.6 |
| PB 3005 | No Adhesion | — |
| PB 3005 + 4 wt % 1,12DA | 8.5 | 5.1 |

[a]1,12DA = 1,12 diaminododecane (98% pure grade available from Aldrich Chemical Company)
[b]Diamine was compounded with the maleic anhydride modified polypropylene at 2 moles diamine per mole maleic anhydride.
[1]ASTM D1876 describes the T-peel test method. In our method, samples were prepared by compression molding the adhesive polypropylene between two polyketone polymer sheets. The free ends of the polyketone polymer sheet were then clamped into the Instron and pulled with a crosshead speed of 5 in/min. The output is lbs. force versus time. The maximum load and average load per inch width are reported.

The peel test results are listed in Table 2. No adhesion was observed between polyketone polymer and the as-received maleated polypropylenes from the Polybond 3000 series. However, upon reaction with the primary diamine, the materials exhibited maximum load, peel strengths in the order of 8 to 10 lbs/in. The strength of the bond appeared to be almost independent of the level of maleic anhydride in the system. The bond strength was maintained throughout the retort process.

As was expected, the polypropylene homopolymer (PP5384) did not adhere to the polyketone polymer sheet. No adhesion was observed in the polypropylene homopolymer modified with 1 wt% diamine; although, pyrrole formation was apparent from the yellowing of the polyketone polymer sheet. Since the molecular weight of the alkyl diamine is well below the entanglement length for polypropylene, no improvement in adhesion was expected.

It is evident from the examples and results that the invention method produces an effective bond at the polypropylene/polyketone polymer interface. The strength of the bond is maintained after the retort sterilization process.

Example 2

In this example, the interfacial compatibilization mechanism is demonstrated by diluting the amine modified polypropylene in blends of polypropylene homopolymer. By diluting or blending the amine modified polypropylene with polypropylene homopolymer, it is possible to adjust and optimize the desired level of adhesion for a particular blend, coextrusion, or coating application. The blends of amine modified polypropylene and polypropylene also provide a mechanism to easily control rheological properties in addition to reducing cost.

The materials used in these experiments were Polybond 3001, 1,12 diaminododecane and Shell polypropylene homopolymer (WRD-1074) with a 35 melt flow which was used to dilute the functionalized polypropylene systems.

The amine modified polypropylene materials were prepared by reactive extrusion in a Berstroff 25 mm twin screw extruder. Pellets of the maleated polypropylene and polypropylene homopolymer were dry blended with the diamine powder so that 4 moles of amine end groups were present for each mole of maleic anhydride. The zone temperatures along the barrel were set from 220° to 190° C. The melt temperature was 205° C.

The different compositions of amine modified polypropylene materials are listed in Table 3. The 25/75 amine modified polypropylene/polypropylene material was prepared by blending the Shell polypropylene homopolymer (WRD-1074) and 100/0 amine modified polypropylene/propylene materials in a second extrusion step.

T-peel specimens were prepared and tested in the same manner as described previously in Example 1. The results are shown in Table 3.

TABLE 3

Amine modified polypropylene (AMPP) polypropylene (PP) homopolymer blends.

| Sample | Blend Composition | Avg. Max. Load (lbs/in) |
|---|---|---|
| AMPP/PP 0/100 | 100 wt % WRD-1074 | 0 |
| AMPP/PP 100/0 | 100 wt % AMPP | 8.2 |
| AMPP/PP 75/25 | 75 wt % AMPP + 25 wt % WRD-1074 | 7.5 |
| AMPP/PP 50/50 | 50 wt % AMPP + 50 wt % WRD-1074 | 6.3 |
| AMPP/PP 25/75 | 25 wt % AMPP/PP 100/0 + 75 wt % WRD-1074 PP | 3.2 |

In Table 3, the average maximum load for the T-Peel tests are given as a function or polypropylene homopolymer composition in the AMPP materials. The adhesive strength of the AMPP material decreases as the functionalized material is diluted with polypropylene homopolymer. However, the level of adhesion even in the most dilute blends is significantly higher than that achieved with the homopolymer and sufficient for use in many applications including tie-layer systems, blends, and coextrusion.

Example 3

Coextruded products such as tubings, pipes, and films manufactured from polyolefins and polyketone combine the desirable attributes of both materials. However, the combination of these polymers to form useful products is limited by the poor interfacial adhesion between the polymer layers. In this example, it is shown that the inventive mechanism for compatibilization can be used to improve the adhesion between the polyolefin and polyketone layers of coextruded tubings.

The materials used in this example are polyketone polymer, polypropylene homopolymer, and the amine modified polypropylene/polypropylene 50/50 material described in Example 2. Coextruded tubing was manufactured using the polyketone as the inner layer and the polyolefin materials as the outer layer. A manifold die was used with the standard melt processing conditions for polyolefins and polyketone being employed. The outer diameter of the tubing was roughly ¼-inch.

The adhesion was tested by observing the failure of the interface from a "kink test". In this test, the nominal ¼" coextruded tube was bent until the tubing kinked. The interface in this high strain region was then examined for delamination between the polyolefin and polyketone layers of the tubing. Tubes which showed interfacial delamination in the kinked area were labeled failures. Coextruded tubing which maintained its integrity without delaminating passed. The results are shown in Table 4.

TABLE 4

| Result for co-extruded composite systems. | |
|---|---|
| Coextruded Tube Construction (polyketone/polyolefin) | Kink Test Result |
| Polyketone/Polypropylene homopolymer | Fail |
| Polyketone/(AMPP/PP 50/50) | Pass |

The coextruded tubing constructed of polypropylene homopolymer and polyketone layers displayed a significant amount of delamination both before and after the bend test. Tubing processed with the amine modified polyolefin passed the "kink test". The adhesion of the polyketone and modified polyolefin interface was sufficient to endure the high strain levels at the bond of the kink.

While this invention has been described in detail for the purpose of illustration, it is not to be construed as limited thereby but is intended to cover all changes and modifications within the spirit and scope thereof.

What is claimed is:

1. A composite system comprising an aminated modified polyolefin and a linear alternating polymer of carbon monoxide and at least one ethylenically unsaturated hydrocarbon.

2. A composite system as in claim 1 wherein said modified polyolefin is a maleic anhydride grafted polypropylene.

3. A process for producing the composite system of claim 1 comprising reacting said modified polyolefin with an amine to form an imide with a free primary amine, then causing the amine to react with said linear polymer to form a pyrrole.

4. A process as in claim 3 wherein said amine is a member from the group consisting of diamines, aromatic diamines diethyltriamine (DETA), triethylenetetramine (TETA), isophorene diamine, and polyether diamines.

5. A process as in claim 4 wherein said amine has at least two unhindered primary amines.

6. A composite system as in claim 1 wherein compatibilization is obtained by the formation of graft copolymers of said linear polymer and said aminated polyolefin at the interface of said copolymer components.

7. A composite system as in claim 1 having and exhibiting interfacial bonding.

8. An article of manufacture made from the composite system of claim 1.

* * * * *